(12) United States Patent
Sugiyama

(10) Patent No.: US 11,709,642 B2
(45) Date of Patent: Jul. 25, 2023

(54) IMAGE PROCESSING APPARATUS

(71) Applicant: BROTHER KOGYO KABUSHIKI KAISHA, Nagoya (JP)

(72) Inventor: Ayako Sugiyama, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 154 days.

(21) Appl. No.: 16/798,799

(22) Filed: Feb. 24, 2020

(65) Prior Publication Data
US 2020/0272388 A1    Aug. 27, 2020

(30) Foreign Application Priority Data
Feb. 25, 2019   (JP) ................................ 2019-031552

(51) Int. Cl.
*G06F 3/00*     (2006.01)
*G06F 3/12*     (2006.01)
*G06F 12/08*    (2016.01)

(52) U.S. Cl.
CPC .......... *G06F 3/1259* (2013.01); *G06F 3/1207* (2013.01); *G06F 3/1208* (2013.01); *G06F 3/1219* (2013.01); *G06F 12/08* (2013.01)

(58) Field of Classification Search
CPC .... G06F 3/1208; G06F 3/1219; G06F 3/1207; G06F 3/1218; G06F 3/1259; G06F 12/08
See application file for complete search history.

(56) References Cited

U.S. PATENT DOCUMENTS

| | | | |
|---|---|---|---|
| 8,941,872 B1 * | 1/2015 | Lellouche | G06Q 30/0207 358/1.15 |
| 10,803,505 B2 * | 10/2020 | Asbury | G06K 9/6267 |
| 2009/0279108 A1 | 11/2009 | Hoshi et al. | |
| 2010/0123925 A1 * | 5/2010 | Tomaru | G06F 3/1208 358/1.15 |
| 2011/0055693 A1 | 3/2011 | Yoshimoto et al. | |

(Continued)

FOREIGN PATENT DOCUMENTS

| | | |
|---|---|---|
| JP | 2007-185912 A | 7/2007 |
| JP | 2009-283993 A | 12/2009 |

(Continued)

OTHER PUBLICATIONS

Office Action issued in related Japanese patent application No. 2019-031552, dated Oct. 18, 2022.

*Primary Examiner* — Kyle R Stork
(74) *Attorney, Agent, or Firm* — Merchant & Gould P.C.

(57) ABSTRACT

An image processing apparatus includes: a controller configured to: control a reader to read an image on a reading medium; determine whether a preview image corresponding to the read image is to be displayed on a display, based on a setting value for a setting item, reading-obtained information, or the setting value and the reading-obtained information, in a case where the controller determines that the preview image is to be displayed, control the display to display the preview image, and execute a particular processing based on obtained read-image data in a case where a processing instruction is input after the preview image is displayed; and in a case where the controller determines that the preview image is not to be displayed, execute the particular processing based on the read-image data without displaying the preview image.

12 Claims, 10 Drawing Sheets

(56) References Cited

U.S. PATENT DOCUMENTS

| | | | |
|---|---|---|---|
| 2013/0155423 A1 | 6/2013 | Shibata | |
| 2016/0295068 A1 | 10/2016 | Otake et al. | |
| 2017/0228155 A1* | 8/2017 | Shirota | G06F 3/061 |
| 2017/0308339 A1* | 10/2017 | Yamazaki | H04N 1/2166 |

FOREIGN PATENT DOCUMENTS

| | | |
|---|---|---|
| JP | 2010-120231 A | 6/2010 |
| JP | 2010-157071 A | 7/2010 |
| JP | 2011-048512 A | 3/2011 |
| JP | 2013-131845 A | 7/2013 |
| JP | 2016-143216 A | 8/2016 |
| JP | 2017-199090 A | 11/2017 |
| JP | 2018-133627 A | 8/2018 |

\* cited by examiner

FIG.5

| | | SETTING VALUE | INK-USE-AMOUNT DETERMINATION COEFFICIENT p_01 FOR ONE DOCUMENT ×n | SHEET-COST DETERMINATION COEFFICIENT q_01 FOR ONE DOCUMENT ×n |
|---|---|---|---|---|
| USER SETTINGS | THE NUMBER OF COPIES | n | ×n | ×n |
| | SHEET TYPE | PLAIN PAPER | ×1.0 | ×1.0 |
| | | INK-JET PAPER | ×2.0 | ×10.0 |
| | | B01 FROM COMPANY B | ×2.0 | ×10.0 |
| | | OTHER GLOSSY PAPER | ×2.0 | ×10.0 |
| | SHEET SIZE | A3 | ×2.0 | ×2.0 |
| | | A4~A3 | ×1.5 | ×1.5 |
| | | A4 | ×1.0 | ×1.0 |
| | | A5~A4 | ×0.8 | ×0.8 |
| | | A5 OR LESS | ×0.5 | ×0.5 |
| | COPY IMAGE QUALITY | STANDARD | ×1.0 | ×1.0 |
| | | GRAPH/MAP | ×1.0 | ×1.0 |
| | | TEXT | ×1.0 | ×1.0 |
| | | PHOTO | ×2.0 | ×1.0 |
| | LAYOUT COPY | OFF (1in1) | ×1.0 | ×1.0 |
| | | 2in1 (VERTICAL) | ×0.5 | ×1.0 |
| | | 2in1 (HORIZONTAL) | ×0.5 | ×1.0 |
| | | 2in1 (ID CARD) | ×0.25 | ×1.0 |
| | | 4in1 (VERTICAL) | ×0.25 | ×1.0 |
| | | 4in1 (HORIZONTAL) | ×0.25 | ×1.0 |
| | | DIVIDED INTO TWO SHEETS | ×2.0 | ×2.0 |
| | | POSTER (2×1) | ×2.0 | ×2.0 |
| | | POSTER (2×2) | ×4.0 | ×4.0 |
| | | POSTER (3×3) | ×9.0 | ×9.0 |

FIG.6

| DETECTION | | | TOTAL-INK-USE-AMOUNT DETERMINATION COEFFICIENT $p_{02}$ | TOTAL-SHEET-COST DETERMINATION COEFFICIENT $q_{02}$ |
|---|---|---|---|---|
| | THE NUMBER OF PAGES IN DOCUMENT | m | ×m | ×m |
| USER SETTINGS | LAYOUT COPY | OFF (1in1) | ×1.0 | ×1.0 |
| | | 2in1 (VERTICAL) | ×1.0 | ×0.5 |
| | | 2in1 (HORIZONTAL) | ×1.0 | ×0.5 |
| | | 2in1 (ID CARD) | ×1.0 | ×0.5 |
| | | 4in1 (VERTICAL) | ×1.0 | ×0.25 |
| | | 4in1 (HORIZONTAL) | ×1.0 | ×0.25 |
| | | DIVIDED INTO TWO SHEETS | ×1.0 | ×1.0 |
| | | POSTER (2×1) | ×1.0 | ×1.0 |
| | | POSTER (2×2) | ×1.0 | ×1.0 |
| | | POSTER (3×3) | ×1.0 | ×1.0 |
| | DUPLEX COPY | OFF | ×1.0 | ×1.0 |
| | | ONE SIDE TO TWO SIDES | ×1.0 | ×0.5 |
| | | TWO SIDES TO TWO SIDES | ×1.0 | ×0.5 |
| | | TWO SIDES TO ONE SIDE | ×1.0 | ×1.0 |

FIG.7A
FIRST COPYING EXAMPLE: STANDARD COPYING

|  |  | p_01 | q_01 | p_02 | q_02 |
|---|---|---|---|---|---|
| SETTING VALUE | THE NUMBER OF COPIES: 1 | ×1 | ×1 |  |  |
| | SHEET TYPE: PLAIN PAPER | ×1.0 | ×1.0 |  |  |
| | SHEET SIZE: A4 | ×1.0 | ×1.0 |  |  |
| | COPY IMAGE QUALITY: STANDARD | ×1.0 | ×1.0 |  |  |
| | LAYOUT COPY: OFF (1in1) | ×1.0 | ×1.0 | ×1.0 | ×1.0 |
| | DUPLEX COPY: OFF |  |  | ×1.0 | ×1.0 |
| DETECTED DOCUMENT PAGE NUMBER |  |  |  | ×1 | ×1 |
| INK USE AMOUNT P1 FOR ONE DOCUMENT |  | 1.0 |  | ×1.0 |  |
| SHEET COST Q1 FOR ONE DOCUMENT |  |  | 1.0 |  | ×1.0 |
| TOTAL INK USE AMOUNT P2 |  |  |  | 1.0 |  |
| TOTAL SHEET COST Q2 |  |  |  |  | 1.0 |

FIG.7B
SECOND COPYING EXAMPLE: PHOTO COPYING

|  |  | p_01 | q_01 | p_02 | q_02 |
|---|---|---|---|---|---|
| SETTING VALUE | THE NUMBER OF COPIES: 1 | ×1 | ×1 |  |  |
| | SHEET TYPE: B01 FROM COMPANY B | ×2.0 | ×10.0 |  |  |
| | SHEET SIZE: L SIZE | ×0.5 | ×0.5 |  |  |
| | COPY IMAGE QUALITY: PHOTO | ×2.0 | ×1.0 |  |  |
| | LAYOUT COPY: OFF (1in1) | ×1.0 | ×1.0 | ×1.0 | ×1.0 |
| | DUPLEX COPY: OFF |  |  | ×1.0 | ×1.0 |
| DETECTED DOCUMENT PAGE NUMBER |  |  |  | ×3 | ×3 |
| INK USE AMOUNT P1 FOR ONE DOCUMENT |  | 2.0 |  | ×2.0 |  |
| SHEET COST Q1 FOR ONE DOCUMENT |  |  | 5.0 |  | ×5.0 |
| TOTAL INK USE AMOUNT P2 |  |  |  | 6.0 |  |
| TOTAL SHEET COST Q2 |  |  |  |  | 15.0 |

FIG.7C
THIRD COPYING EXAMPLE: COPYING FOR LARGE-SIZE DOCUMENT IN A PLURALITY OF COPIES

|  |  | p_01 | q_01 | p_02 | q_02 |
|---|---|---|---|---|---|
| SETTING VALUE | THE NUMBER OF COPIES: 3 | ×3 | ×3 |  |  |
| | SHEET TYPE: PLAIN PAPER | ×1.0 | ×1.0 |  |  |
| | SHEET SIZE: A3 | ×2.0 | ×2.0 |  |  |
| | COPY IMAGE QUALITY: STANDARD | ×1.0 | ×1.0 |  |  |
| | LAYOUT COPY: 2in1 (VERTICAL) | ×0.5 | ×1.0 | ×1.0 | ×0.5 |
| | DUPLEX COPY: ONE SIDE TO TWO SIDES |  |  | ×1.0 | ×0.5 |
| DETECTED DOCUMENT PAGE NUMBER |  |  |  | ×10 | ×10 |
| INK USE AMOUNT P1 FOR ONE DOCUMENT |  | 3.0 |  | ×3.0 |  |
| SHEET COST Q1 FOR ONE DOCUMENT |  |  | 6.0 |  | ×6.0 |
| TOTAL INK USE AMOUNT P2 |  |  |  | 30 |  |
| TOTAL SHEET COST Q2 |  |  |  |  | 15 |

IMAGE PROCESSING APPARATUS

CROSS REFERENCE TO RELATED APPLICATION

The present application claims priority from Japanese Patent Application No. 2019-031552, which was filed on Feb. 25, 2019, the disclosure of which is herein incorporated by reference in its entirety.

BACKGROUND

The following disclosure relates to a technique of processing an image read from a reading medium.

There is known an image processing system that has a scanning function for reading an image formed on a document and that is capable of printing the image read in the scanning function and sending another device data representing the image read in the scanning function. Many image processing systems of this type have a preview function for displaying a preview image representing the image read in the scanning function.

There is known a printing system configured to determine, before printing, whether a preview image of a printed material is to be displayed, and display the preview image when the printing system determines displaying the preview image. This printing system determines whether the preview image is to be displayed, based on user's print history (e.g., the degree of printing failure).

SUMMARY

The technique used for the above-described printing system is convenient in automatic determination of whether the preview image is to be displayed, but information relating to a print job for actual printing is not referred in determination of whether the preview image is to be displayed. Thus, the determination of whether the preview image is to be displayed does not appropriately reflect the necessity of displaying the preview image.

The necessity of displaying the preview image in the image processing system having the scanning function does not necessarily depend upon a past history but can depend upon the content of the image actually scanned or upon a specific method of processing the image (e.g., a printing method), for example.

Accordingly, an aspect of the disclosure relates to an image processing apparatus capable of appropriately determining the necessity of displaying a preview image of a read image.

In one aspect of the disclosure, an image processing apparatus includes: a reader; a display; an input interface; and a controller configured to execute: a reading processing in which the controller controls the reader to read an image formed on a reading medium; a preview determination processing in which the controller determines whether a preview image corresponding to the image read in the reading processing is to be displayed on the display, based on (i) a setting value for at least one setting item set in the image processing apparatus, (ii) reading-obtained information obtained in the reading processing, or (iii) the setting value and the reading-obtained information; a first image processing in which in a case where the controller determines in the preview determination processing that the preview image is to be displayed, the controller controls the display to display the preview image, and executes a particular processing based on read-image data obtained in the reading processing in a case where a processing instruction is input via the input interface after the preview image is displayed; and a second image processing in which in a case where the controller determines in the preview determination processing that the preview image is not to be displayed, the controller executes the particular processing based on the read-image data without displaying the preview image.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 5 is a view for explaining a unit-determination-coefficient table;

FIG. 6 is a view for explaining a total-determination-coefficient table;

FIG. 7A is a. view for explaining a first example of calculation of an ink use amount and a. sheet cost;

FIG. 7B is a. view for explaining a. second example of calculation of the ink use amount and the sheet cost;

FIG. 7C is a view for explaining a third example of calculation of the ink use amount and the sheet cost;

EMBODIMENTS

1. First Embodiment 1-1. Configuration of Image Processing Apparatus

Hereinafter, there will be described embodiments by reference to the drawings. An image processing apparatus 10 according to the present embodiment in FIG. 1 has a plurality of functions including a scanning function, a printing function, a copying function, and a facsimile function, for example. The scanning function is a function for reading an image formed on a document to create image data based on the read image. The printing function is a function for printing an image on a recording sheet. The copying function is a function using the printing function to print an image read in the scanning function. The facsimile function is a function for transmitting and receiving facsimile data.

Figure 1:
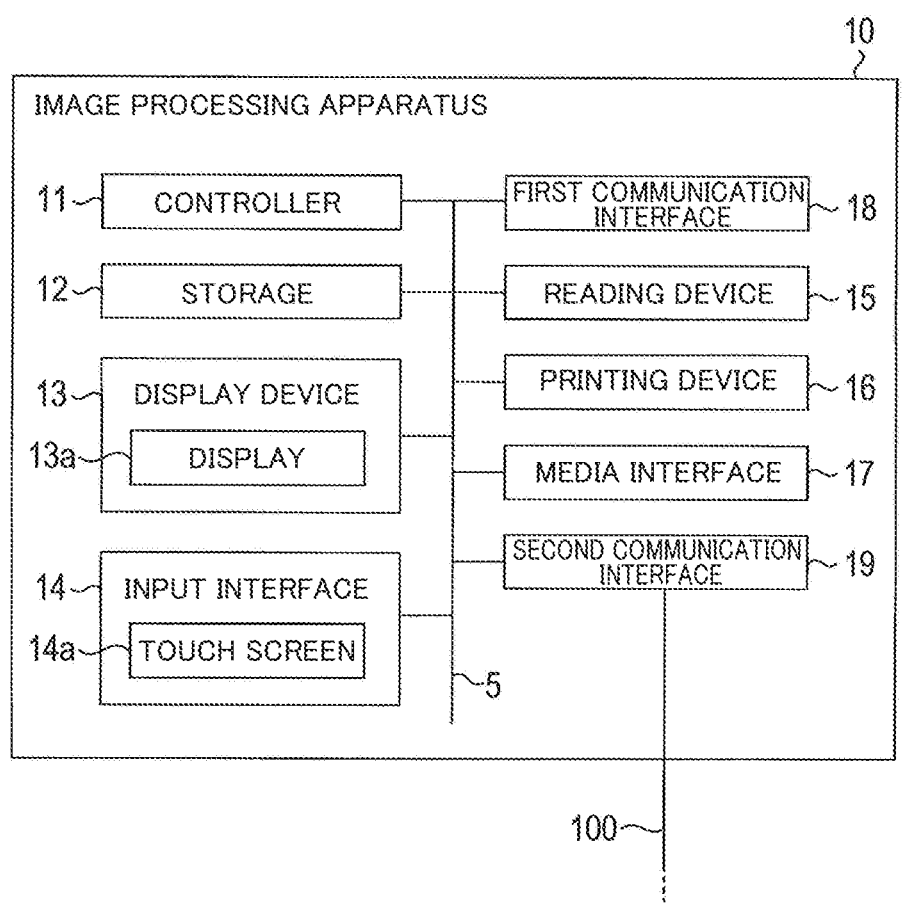
FIG. 1 is a block diagram illustrating the configuration of an image processing apparatus.

As illustrated in FIG. 1, the image processing apparatus 10 includes a controller 11, a storage 12, a display device 13, an input interface 14, a reading device 15, a printing device 16, a media interface 17, a first communication interface 18, and a second communication interface 19, which are connected to each other via a bus 5.

The controller 11 includes a central processing unit (CPU), for example. The storage 12 includes semiconductor memories including a read-only memory (ROM), a random-access memory (RAM), a nonvolatile random access memory (NVRAM), and a flash memory, for example. That is, the image processing apparatus 10 according to the present embodiment includes a microcomputer including the CPU and the semiconductor memories.

The controller 11 performs various functions by executing programs stored in a non-transitory storage medium. In the present embodiment, the storage 12 is one example of the non-transitory storage medium storing the programs. It is noted that the various functions to be performed by the controller 11 are not limited to those performed by execution of the programs (i.e., a software processing), and some or all of the functions may be performed using one or more hardware devices.

Figure 2:
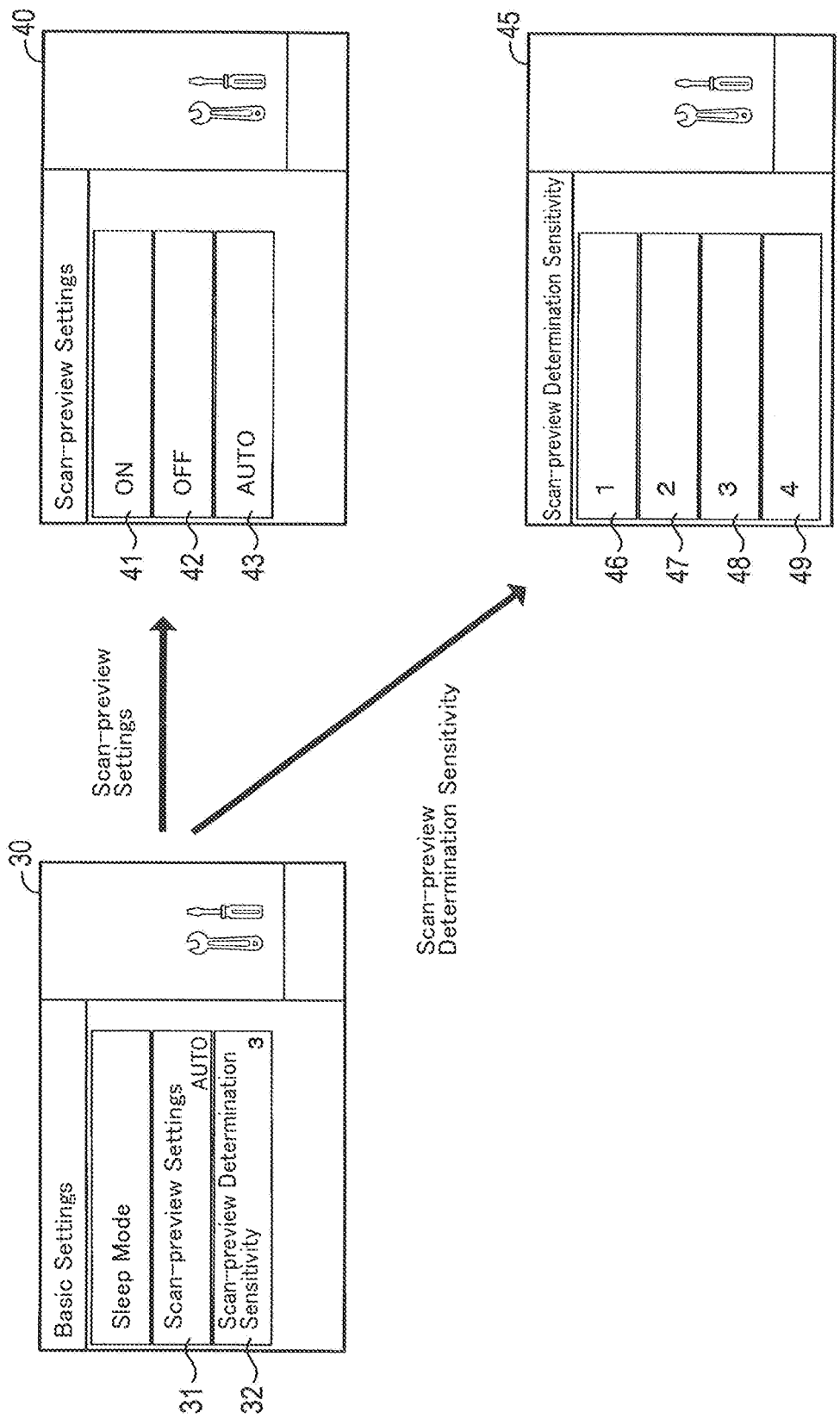
FIG. 2 is a view for explaining an example of screen transition in setting of setting items relating to a preview function.
Figure 3:
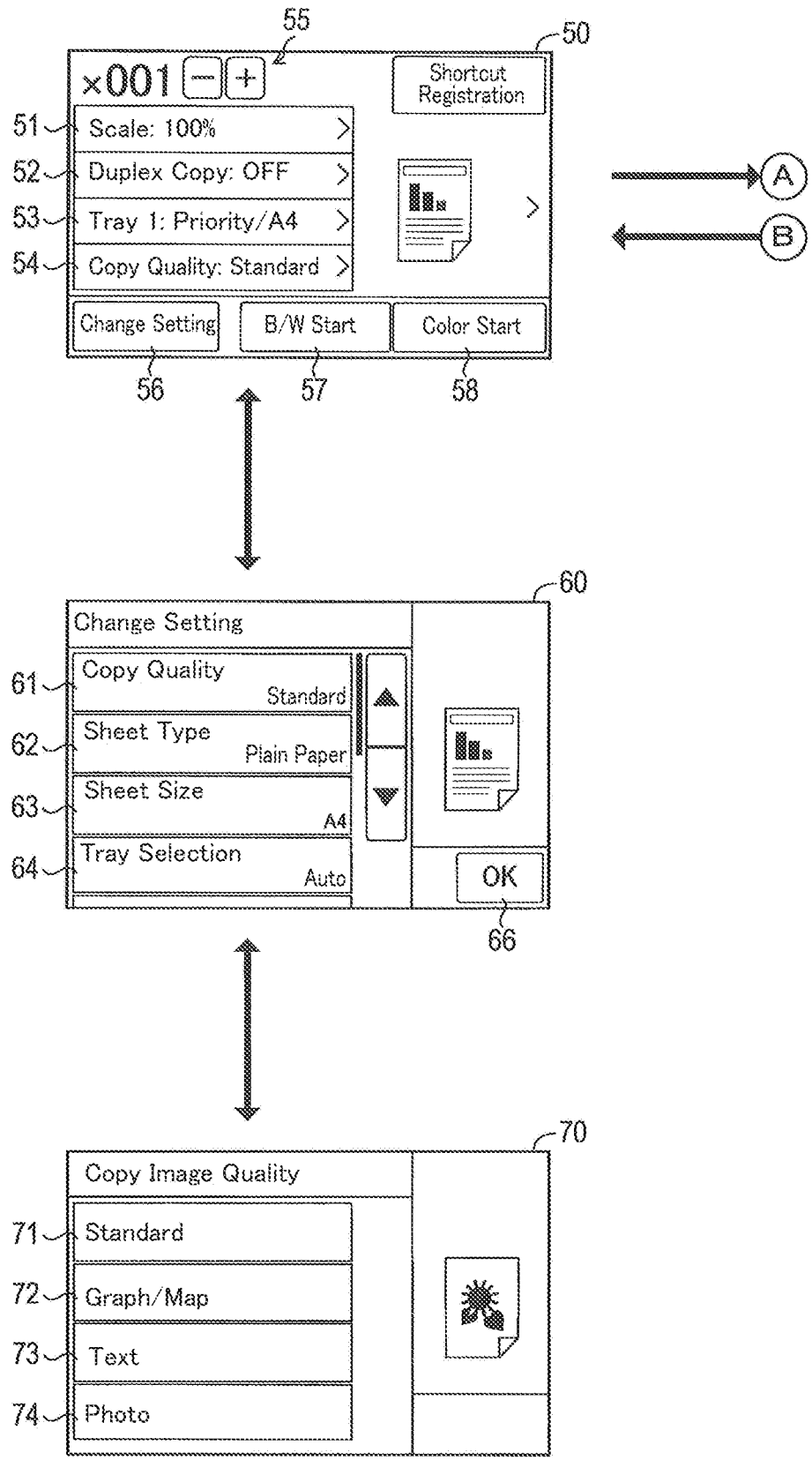
FIG. 3 is a view for explaining an example of screen transition in setting of setting items relating to a copying function.
Figure 4:
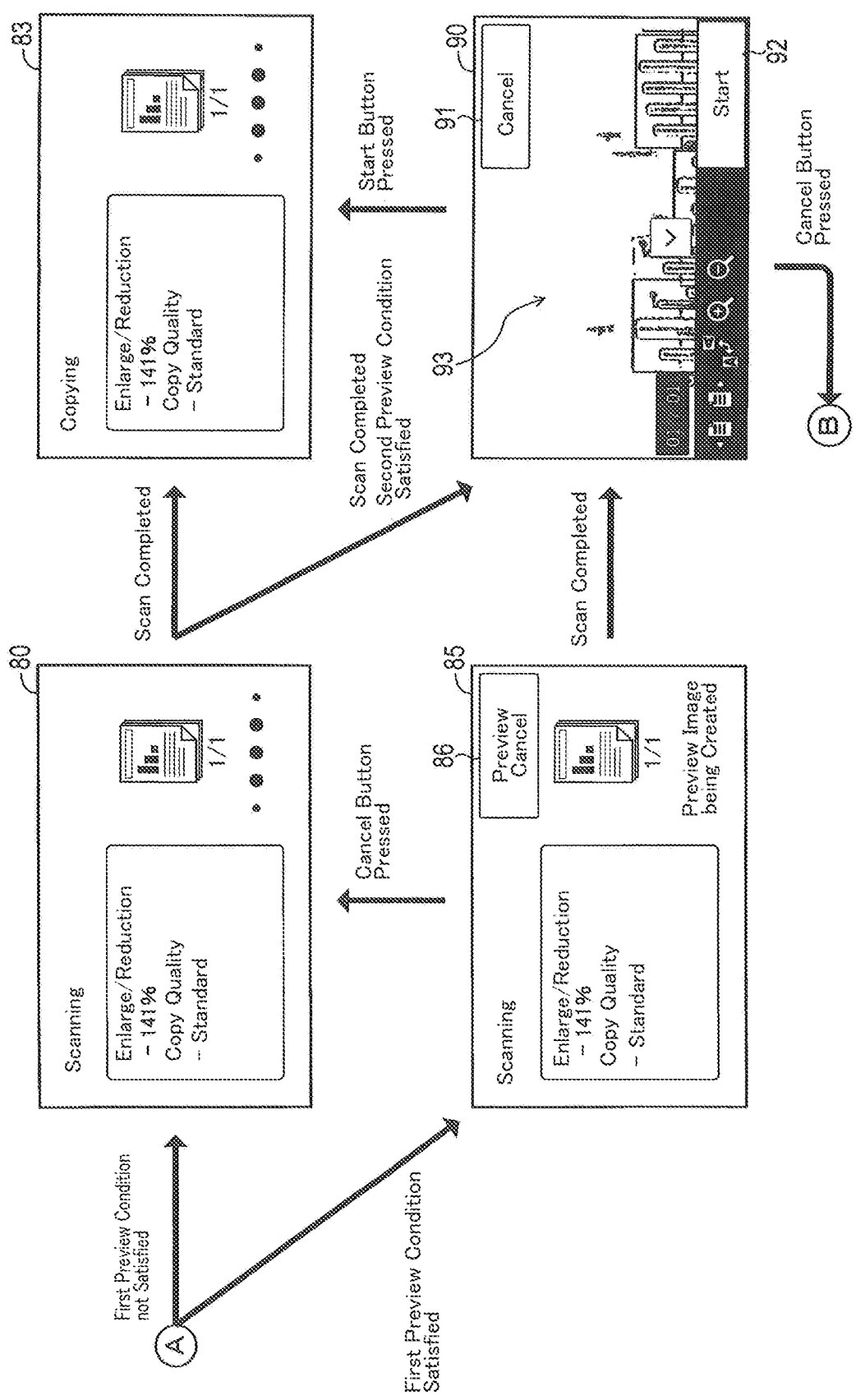
FIG. 4 is a view for explaining an example of screen transition in performing the copying function.

The storage 12 stores data relating to various screens including screens illustrated in FIGS. 2-4. The storage 12 further stores data in a unit-determination-coefficient table illustrated in FIG. 5, data in a total-determination-coefficient table illustrated in FIG. 6, and programs for a copy process illustrated in FIGS. 8 and 9, for example.

The display device 13 in the present embodiment includes a display 13a for displaying various kinds of information. The input interface 14 includes an input device for accepting various input operations. In the present embodiment, the input interface 14 includes a touch screen 14a as the input device. The touch screen 14a is superposed on an image display region of the display device 13. The image display region is a region on which an image is to be displayed.

The touch screen 14a superposed on the image display region of the display device 13 is configured to detect an instructing operation that is a touch or an approach of an input object on or to the image display region. That is, in the case where a user is performing the instructing operation with the input object relative to the image display region, the touch screen 14a can output positional information representing an instructed position at which the user is performing the instructing operation. In the present embodiment, the touch screen 14a is configured to continuously or periodically output the positional information while the instructing operation is being performed with the input object.

It is noted that the touch screen 14a may be configured to detect any of only a touch of the input object, only an approach of the input object, and both of a touch and an approach of the input object as the instructing operation.

The controller 11 is configured to obtain the positional information output from the touch screen 14a and based on the obtained positional information detect (i) the presence or absence of the instructing operation with the input object, (ii) the instructed position in the case where the user is performing the instructing operation, and (iii) at least one type of a specific operation with the input object in the case where the user is performing the instructing operation.

Examples of the specific operation detectable by the controller 11 include a tap, a flick, and a drag. The tap is an operation in which, after the instructing operation is performed with the input object, the input object moves off or away from the touch screen 14a at the same position. Examples of the input object to be used for the instructing operation include a fingertip and a particular instructing device such as a stylus.

The reading device 15 includes an image sensor and is configured to read an image formed on a document to create image data based on the read image. Hereinafter, the read image and the image data based on the read image may be hereinafter referred to as "scanned image" and "scanned data", respectively. The image sensor may be any of a charge-coupled-device (CCD) image sensor and a complementary-metal-oxide-semiconductor (CMOS) image sensor, for example. The document may be any of at least one of a paper sheet, a cloth, and a label, for example.

It is noted that the image processing apparatus 10 includes a document table, not illustrated, for supporting a document. The reading device 15 is configured to read an image formed on the document placed on the document table. The image processing apparatus 10 may include an automatic document feeder (ADF). The reading device 15 may be configured to perform what is called duplex scanning for reading images on both sides of the document placed on the document table and/or the document set on the ADF.

The printing device 16 includes an ink-jet or electrophotographic printing mechanism and is capable of printing an image on the recording sheet. The printing mechanism is provided with at least one color-material cartridge storing a color material as a material of a color.

The printing device 16 prints an image on the recording sheet by ejecting or transferring the color material stored in the color-material cartridge, onto or to the recording sheet based on the image to be printed. It is noted that the ink-jet printing mechanism includes liquid ink or gel ink as the color material, for example. The electrophotographic printing mechanism includes powdered toner as the color material, for example.

In the present embodiment, the printing device 16 includes the ink-jet printing mechanism. The media interface 17 is an interface on which at least one of various storage media such as a USB flash memory is to be mounted, for example. The media interface 17 controls writing and reading of data into or from the mounted storage medium.

The first communication interface 18 is a communication interface for connecting the image processing apparatus 10 to a network, not illustrated. The network may be any of a wired local-area network (LAN), a wireless LAN, and other wireless communication networks, for example. The image processing apparatus 10 is capable of performing data communication via the first communication interface 18 with various information processing devices including a personal computer (PC), a smartphone, and a tablet computer. The image processing apparatus 10 is connectable to the Internet via the first communication interface 18 to perform data communication over the Internet with other various servers and/or various information processing devices, for example.

The second communication interface 19 is an interface for communicating with an external device over a communication network 100. The communication network 100 connected to the second communication interface 19 is a public telephone network in the present embodiment, for example. Transmission and reception of facsimile data in the facsimile function are principally performed via the second communication interface 19.

The scanning function is principally performed by control of the reading device 15 by the controller 11. Specifically, the scanning function in the present embodiment includes a plurality of sub-functions each relating to a method of processing the scanned image. Examples of the sub-functions include a scan-to-USB-memory function, a scan-to-PC function, and a scan-to-email-transmission function. The scan-to-USB-memory function is a function for outputting and storing the scanned data into the USB memory connected to the media interface 17. The scan-to-PC function is a function of transmitting the scanned data to another information processing device connected to the image processing apparatus 10. The scan-to-email-transmission function is a function of transmitting the scanned data by an electronic mail.

The copying function is principally performed by control of the reading device 15 and the printing device 16 by the controller 11. That is, the controller 11 obtains the scanned data by controlling the reading device 15 to read an image formed on the document, i.e., by performing the scanning function. The controller 11 thereafter outputs a printed material by controlling the printing device 16 to perform printing based on the scanned data, i.e., by performing the printing function. The printed material is a recording sheet on which the scanned image is printed.

1-2. Overview of Copying Function

There will be next described the copying function of the image processing apparatus 10 according to the present embodiment. When the copying function is started, the image processing apparatus 10 uses the scanning function to read an image formed on the document. That is, the document placed on the document table or set on the ADF is read by the reading device 15 to create scanned data. The image processing apparatus 10 then uses the printing function to print a scanned image on the recording sheet based on the scanned data.

Here, the copying function has a preview function in the present embodiment. The preview function is a function for displaying a preview image of the printed material before printing of the scanned image. The preview image is an image representing a state in which the scanned image is printed on the recording sheet in reality. The user can view the preview image before printing to check the position and the size of the scanned image to be printed on the recording sheet.

The user can set the preview function to any of "OFF", "ON", and "AUTO". In the case where the preview function is set to "ON", each time when the copying function is performed, the preview image is displayed before printing. In the case where the preview function is set to "OFF", each time when the copying function is performed, the scanned image is printed without displaying the preview image.

In the case where the preview function is set to "AUTO", each time when the copying function is performed, a preview determination function is performed. The preview determination function is a function for automatically determining whether the necessity of displaying the preview image is high. This determination may be hereinafter referred to as "preview determination". In the case where the controller 11 determines in the preview determination that the necessity of displaying the preview image is high, the preview image is displayed before printing. In the case where the controller 11 determines in the preview determination that the necessity of displaying the preview image is not high, that is, in the case where the necessity of displaying the preview image is low, the preview image is not displayed.

It is noted that the controller 11 may determine in the preview determination whether the preview image needs to be displayed. In this case, the image processing apparatus 10 may be configured: to display the preview image when the controller 11 determines in the preview determination that the preview image needs to be displayed; and not to display the preview image when the controller 11 determines in the preview determination that the preview image need not be displayed.

In the present embodiment, the controller 11 executes the preview determination based on setting values for various setting items set in the image processing apparatus 10 and a result of reading of the image in the scanning function. The setting values used in the preview determination may be setting values for setting items to be used in the scanning function of the copying function to be performed and may be setting values for setting items to be used when the scanned image read in the scanning function is printed in the printing function of the copying function to be performed, for example.

The user, for example, can selectively set the preview function to one of "ON", "OFF", and "AUTO" as follows. The user first causes the display device 13 to display a basic-setting screen 30 illustrated in FIG. 2. When the image processing apparatus 10 is turned on, the display device 13 displays a standby screen, not illustrated. The user can perform a particular screen switching operation with the standby screen functioning as a start-off screen, to cause the display device 13 to display the basic-setting screen 30.

The basic-setting screen 30 contains a plurality of buttons including a preview setting button 31 and a preview-determination-sensitivity button 32. When the preview setting button 31 is selected by the user, the display device 13 displays a preview-setting screen 40 illustrated in FIG. 2. When the preview-determination-sensitivity button 32 is selected, the display device 13 displays a determination-sensitivity-setting screen 45 illustrated in FIG. 2. The selecting operation may be any operation and is the above-described tap in the present embodiment, for example.

The preview-setting screen 40 accepts user's input of setting the preview function to one of "ON", "OFF", and "AUTO". As illustrated in FIG. 2, the preview-setting screen 40 contains an ON button 41, an OFF button 42, and an AUTO button 43. When the ON button 41 is selected, the preview function is set to "ON". When the OFF button 42 is selected, the preview function is set to "OFF". When the AUTO button 43 is selected, the preview function is set to "AUTO".

The determination-sensitivity-setting screen 45 accepts user's input of setting a preview determination sensitivity. In the preview determination function in the present embodiment, the controller 11 calculates at least one type of a determination parameter and determines the necessity of displaying the preview image based on the calculated determination parameter. More specifically, in the present embodiment, when the determination parameter exceeds a corresponding threshold value, the controller 11 determines that the necessity of displaying the preview image is high.

The preview determination sensitivity indicates the easiness for the controller 11 to determine that the necessity of displaying the preview image is high. More specifically, the preview determination sensitivity indicates the level of the above-described threshold value. The easiness for the controller 11 to determine that the necessity of displaying the preview image is high increases with increase in the preview determination sensitivity, i.e., decrease in the threshold value. In contrast, the easiness for the controller 11 to determine that the necessity of displaying the preview image is high decreases with decrease in the preview determination sensitivity, i.e., increase in the threshold value.

In the present embodiment, the preview determination sensitivity is settable to one of the sensitivities 1-4. The sensitivity 1 is the lowest in the preview determination sensitivity among the sensitivities 1-4, and the threshold value indicated by the sensitivity 1 is 32, for example. The sensitivity 2 is higher than the sensitivity 1 in the preview determination sensitivity, and the threshold value indicated by the sensitivity 2 is 16, for example. The sensitivity 3 is higher than the sensitivity 2 in the preview determination sensitivity, and the threshold value indicated by the sensitivity 3 is eight, for example. The sensitivity 4 is higher than the sensitivity 3 in the preview determination sensitivity, and the threshold value indicated by the sensitivity 4 is four, for example. That is, the threshold value is set so as to decrease with increase in the preview determination sensitivity.

The determination-sensitivity-setting screen 45 contains a sensitivity-1 button 46, a sensitivity-2 button 47, a sensitivity-3 button 48, and a sensitivity-4 button 49. When the sensitivity-1 button 46 is selected, the preview determination sensitivity is set to the sensitivity 1. When the sensitivity-2 button 47 is selected, the preview determination sensitivity is set to the sensitivity 2. When the sensitivity-3 button 48 is selected, the preview determination sensitivity is set to the sensitivity 3. When the sensitivity-4 button 49 is selected, the preview determination sensitivity is set to the sensitivity 4. In the case where the user wants to display the preview image as infrequently as possible, the preview determination sensitivity at least needs to be set to a low value (e.g., the sensitivity 1 or the sensitivity 2). On the other hand, in the case where the user wants to display the preview image as frequently as possible, the preview determination sensitivity at least needs to be set to a high value (e.g., the sensitivity 3 or the sensitivity 4).

1-3. Example of Screen Transition in Performing of Copying Function

There will be next described, with reference to FIGS. 3 and 4, one example of transition of screen displayed on the display device 13 in performing of the copying function especially in the case where the preview setting is set at "AUTO".

The user can cause the display device 13 to display a copy-start screen 50 illustrated in FIG. 3 by switching the above-described standby screen, for example. The copy-start screen 50 contains a plurality of setting-value display buttons. The setting-value display buttons include a scaling-setting display button 51, a duplex-copy-setting display button 52, a tray-setting display button 53, and a copy-image-quality-setting display button 54, for example.

Displayed on the scaling-setting display button 51 is the current setting value of a copy scale that indicates an enlargement/reduction ratio to be used for printing of the scanned image on the recording sheet. Displayed on the duplex-copy-setting display button 52 is the current setting value of a duplex-copy setting that indicates whether the scanned image or images are to be printed on one side or both sides of the recording sheet. Displayed on the tray-setting display button 53 is the current setting value of a tray being used which indicates a tray supporting the recording sheet to be used for printing of the scanned image. Displayed on the copy-image-quality-setting display button 54 is the current setting value of a copy image quality that indicates an image quality for printing of the scanned image on the recording sheet. It is noted that the setting-value display buttons other than the buttons 51-54 may be displayed or displayable.

The user can view each of the setting-value display buttons to check the current setting value of a corresponding one of the various setting items in the copying function. The copy-start screen 50 further contains a Change Setting button 56, a B/W Start button 57, and a Color Start button 58.

In the present embodiment, the various setting items settable for performing of the copying function include not only the copy scale, the duplex-copy setting, the tray being used, and the copy image quality but also the number of copies, a sheet type, a sheet size, and layout copy, for example. The number of copies indicates the number of the recording sheets on which the same scanned image is to be printed. The sheet type indicates the type of the recording sheet on which the scanned image is to be printed. The sheet size is the size of the recording sheet on which the scanned image is to be printed. The layout copy indicates the size of one scanned image to be printed on one recording sheet or a plurality of the recording sheets. A plurality of selectable setting values are provided for each of the setting items. The user can set any one of the setting values for each of the setting items.

The setting value for the setting item is changeable by selecting the Change Setting button 56 displayed on the copy-start screen 50, for example. When the Change Setting button 56 is selected, the display device 13 displays a setting-item screen 60 illustrated in FIG. 3. A plurality of setting-item buttons are displayed on the setting-item screen 60 for each setting item. The plurality of setting-item buttons displayed on the setting-item screen 60 in FIG. 3 include a copy-image-quality setting button 61 corresponding to the copy image quality, a sheet-type setting button 62 corresponding to the sheet type, a sheet-size button 63 corresponding to the sheet size, and a tray-selection button 64 corresponding to the tray being used, by way of example.

When any one of the setting-item buttons is selected, the display device 13 displays a setting-value selection screen for selection of one of setting values for the setting item corresponding to the selected setting-item button. The setting-value selection screen contains a plurality of buttons respectively corresponding to the selectable setting values. When one of the plurality of buttons is selected, the setting value corresponding to the selected button is selected and set.

For example, when the copy-image-quality setting button 61 is selected on the setting-item screen 60, the display device 13 displays an image-quality setting screen 70 illustrated in FIG. 3. In the present embodiment, for example, the following four setting values are provided for the copy image quality: "Standard", "Graph/Map", "Text", and "Photo". Thus, as illustrated in FIG. 3, the image-quality setting screen 70 contains a Standard button 71 corresponding to "Standard", a Graph/Map button 72 corresponding to "Graph/Map", a Text button 73 corresponding to "Text", and a Photo button 74 corresponding to "Photo". When any one of the buttons is selected, the copy image quality is set to the image quality corresponding to the selected button.

In the present embodiment, the setting value "Photo" is higher in image quality than the other three setting values among the four image qualities settable in the copy image quality. Thus, in the case where the copy image quality is set to "Photo", when compared with the case where printing is performed with any of the other setting values, a large amount of the color material is consumed to print the same image.

In the present embodiment, setting values provided for the sheet type include plain paper, ink-jet paper, B01 from company B, and various other kinds of glossy paper, for example. In the present embodiment, setting values provided for the sheet size include A3, A4, A5, B5, and L size, for example.

In the present embodiment, setting values provided for the layout copy include OFF, 2in1 (vertical), 2in1 (horizontal), 4in1 (vertical), and poster (2×1), for example. The setting value "OFF" for the layout copy indicates that one scanned image is to be printed on one page of the recording sheet. The setting value "2in1 (vertical)" indicates that two scanned images are to be printed on one page of the recording sheet so as to be arranged equally in the vertical direction. The setting value "poster (2×1)" indicates that one scanned image is divided into two images that are printed on two recording sheets, respectively.

In the present embodiment, setting values provided for the duplex-copy setting include OFF, one side to two sides, two sides to two sides, and two sides to one side, for example. The setting value "OFF" for the duplex-copy setting indicates that an image formed on one side of a document is to be printed on one side of a recording sheet. The setting value "one side to two sides" indicates that images formed on one sides of respective two documents are to be printed respectively on two sides of a recording sheet. The setting value "two sides to one side" indicates that images formed respectively on two sides of a document are to be printed respectively on one sides of respective two recording sheets.

When the B/W Start button 57 or the Color Start button 58 is selected on the copy-start screen 50, the copying function is started. When the B/W Start button 57 is selected, an image formed on the document is printed in white and black. When the Color Start button 58 is selected, an image formed on the document is printed in color.

When the copying function is started, the scanning function is first performed to read an image formed on the document to create scanned data of the scanned image. When the copying function is started, the preview determination is executed. More specifically, the controller 11 executes first preview determination to determine whether a first preview condition is satisfied.

The first preview condition is satisfied in the case where the determination parameter calculated based on one or more of the setting values for the setting items used in the copying function exceeds the threshold value corresponding to the currently set preview determination sensitivity. In the present embodiment, two determination parameters are calculated, and the first preview condition is satisfied when at least one of the two determination parameters has exceeded the threshold value. The two determination parameters include: a unit ink use amount P1 indicating an estimated amount of use of the ink required for printing one scanned image obtained by reading a document (i.e., one page of a document), on a recording sheet in one copy; and a unit sheet cost Q1 indicating an estimated cost for a recording sheet required for printing one scanned image obtained by reading a document, on a recording sheet in one copy. It is noted that the one copy indicates the number of copies.

In the present embodiment, the controller 11 refers to the unit-determination-coefficient table in FIG. 5 to calculate the unit ink use amount P1 and the unit sheet cost Q1 based on the current setting values for the respective five setting items: the number of copies, the sheet type, the sheet size, the copy image quality, and the layout copy setting.

The unit-determination-coefficient table in FIG. 5 is stored in the storage 12, for example. This unit-determination-coefficient table stores a unit-ink-use-amount determination coefficient $p\_01$ for each setting value and a unit-sheet-cost determination coefficient $q\_01$ for each setting value for each setting item.

The reference value of the unit-ink-use-amount determination coefficient $p\_01$ is set to 1.0 as an estimated amount of the ink to be used for printing of a scanned image formed on a document in one copy in the case where copying is performed based on standard setting values. Also, the unit-ink-use-amount determination coefficient $p\_01$ is represented as a ratio between (i) an estimated amount of the ink to be used in the case where printing is performed based on other setting values, and (ii) the estimated amount of the ink to be used in the case where printing is performed based on the standard setting values.

In the present embodiment, the standard setting values are as follows: the number of copies is one; the sheet type is plain paper; the sheet size is A4; the copy image quality is standard; and the layout copy setting is OFF, for example. Thus, as illustrated in FIG. 5, the unit-ink-use-amount determination coefficient $p\_01$ for the number of copies is equal to the number of copies n. That is, in the case where the number of copies is two, for example, the unit-ink-use-amount determination coefficient $p\_01$ is equal to two.

As illustrated in FIG. 5, the unit-ink-use-amount determination coefficient $p\_01$ for the sheet type is set to 2.0 for all the sheet types other than the plain paper. This is because an amount of the color material used for printing on the recording sheet other than the plain paper sheet is larger than (for example, twice as large as) that used for printing on the plain paper sheet.

As illustrated in FIG. 5, the sheet size is classified into five sizes: A3; a size greater than A4 and less than A3; A4; a size greater than A5 and less than A4; and a size less than or equal to A5. The unit-ink-use-amount determination coefficient $p\_01$ is set for each size. Specifically, the unit-ink-use-amount determination coefficient $p\_01$ is set to increase with increase in the sheet size. This is because an amount of the color material to be used may increase with increase in size of the recording sheet.

As illustrated in FIG. 5, the unit-ink-use-amount determination coefficient $p\_01$ for the copy image quality is set to 2.0 for the photo and set to 1.0 for all the copy image qualities other than the photo. This is because the image quality for the photo is greater than that of each of the other copy image qualities and accordingly uses a larger amount of the color material for printing than the other copy image qualities.

As illustrated in FIG. 5, the layout copy setting is set such that the unit-ink-use-amount determination coefficient $p\_01$ decreases with increase in the number of scanned images to be printed on one page of the recording sheet, and the unit-ink-use-amount determination coefficient $p\_01$ increases with increase in the number of the recording sheets in the case where one scanned image is divided into a plurality of images, and these images are to be printed on a plurality of the recording sheets.

The unit ink use amount P1 is calculated by multiplying the five unit-ink-use-amount determination coefficients $p\_01$ together which correspond respectively to the current setting values for the respective five setting items illustrated in FIG. 5. In standard copying as in a first copying example illustrated in FIG. 7A, for example, each of all the unit-ink-use-amount determination coefficients $p\_01$ for the respective setting items is 1.0, and accordingly the unit ink use amount P1 is equal to 1.0 ($=1\times1.0\times1.0\times1.0\times1.0$).

In the case where the number of copies is one, the sheet type is "B01 from company B", the sheet size is L size, the copy image quality is the photo, and the layout copy setting is OFF, for example, as in a second copying example illustrated in FIG. 7B, the unit ink use amount P1 is equal to 2.0 ($=1\times2.0\times0.5\times2.0\times1.0$).

In the case where the number of copies is three, the sheet type is the plain paper, the sheet size is A3, the copy image quality is standard, and the layout copy setting is 2in1 (vertical), for example, as in a third copying example illustrated in FIG. 7C, the unit ink use amount P1 is equal to 3.0 ($=3\times1.0\times2.0\times1.0\times0.5$).

The reference value of the unit-sheet-cost determination coefficient $q\_01$ is set to 1.0 as an estimated cost for the recording sheet to be used for printing of a scanned image formed on a document in one copy in the case where copying is performed based on the standard setting values. Also, the unit-sheet-cost determination coefficient $q\_01$ is represented as a ratio between (i) an estimated cost for the recording sheet to be used in the case where printing is performed based on other setting values, and (ii) the estimated cost for the recording sheet to be used in the case where printing is performed based on the standard setting values.

Thus, as illustrated in FIG. 5, the unit-sheet-cost determination coefficient $q\_01$ for the number of copies is equal to the number of copies n. That is, in the case where the number of copies is two, for example, the unit-sheet-cost determination coefficient $q\_01$ is equal to two.

As illustrated in FIG. 5, the unit-sheet-cost determination coefficient $q\_01$ for the sheet type is set to 10.0 for all the sheet types other than the plain paper. This is because a cost for the recording sheet different from the plain paper sheet is higher than (for example, about ten times as high as) that for the plain paper sheet.

As illustrated in FIG. 5, the unit-sheet-cost determination coefficient $q\_01$ for the sheet size (for the above-described five ranges of the sheet size) is set to increase with increase in sheet size. This is because the cost for the recording sheet may increase with increase in the size of the recording sheet.

As illustrated in FIG. 5, the unit-sheet-cost determination coefficient $q\_01$ for the copy image quality is set to 1.0 for each of the copy image qualities. This is because the cost for the recording sheet does not depend upon the copy image quality principally.

As illustrated in FIG. 5, the unit-sheet-cost determination coefficient $q\_01$ for the layout copy setting is set to 1.0 regardless of the number of scanned images to be printed on one page of the recording sheet and is set to increase with increase in the number of the recording sheets in the case where one scanned image is divided into a plurality of images, and these images are to be printed on a plurality of the recording sheets.

The unit sheet cost Q1 is calculated by multiplying the five unit-sheet-cost determination coefficients $q\_01$ together which correspond respectively to the current setting values for the respective five setting items illustrated in FIG. 5. In the standard copying as in the first copying example illustrated in FIG. 7A, for example, each of all the unit-sheet-cost determination coefficients $q\_01$ for the respective setting items is 1.0, and accordingly the unit sheet cost Q1 is equal to 1.0 (=1×1.0×1.0×1.0×1.0).

In the second copying example illustrated in FIG. 7B, for example, the unit sheet cost Q1 is equal to 5.0 (=1×10.0×0.5×1.0×1.0). In the third copying example illustrated in FIG. 7C, for example, the unit sheet cost Q1 is equal to 6.0 (=3×1.0×2.0×1.0×1.0).

The above-described first preview determination is executed based on the unit ink use amount P1 and the unit sheet cost Q1 calculated as described above. That is, in the case where one or each of the calculated unit ink use amount P1 and unit sheet cost Q1 is greater than the threshold value, the controller 11 determines that the first preview condition is satisfied, and in the case where each of the calculated unit ink use amount P1 and unit sheet cost Q1 is less than or equal to the threshold value, the controller 11 determines that the first preview condition is not satisfied. It is noted that the threshold value may be different between the unit ink use amount P1 and the unit sheet cost Q1. In this case, the threshold value corresponding to the unit ink use amount P1 and the threshold value corresponding to the unit sheet cost Q1 may be settable individually.

After starting the copying function, the image processing apparatus 10 uses the scanning function to start reading the document, and when the controller 11 determines in the first preview determination that the first preview condition is not satisfied, the display device 13 displays a first scanning-state screen 80 illustrated in FIG. 4 during reading of the document. When the reading of the document is completed, the controller 11 executes the preview determination again. More specifically, the controller 11 executes second preview determination to determine whether a second preview condition is satisfied.

The second preview determination is satisfied when at least one of two determination parameters calculated with consideration of a result of reading of all the images on the document exceeds a threshold value corresponding to the set preview determination sensitivity. The two determination parameters in this case are a total ink use amount P2 and a total sheet cost Q2. The total ink use amount P2 represents an estimated amount of use of the ink required to complete the copying function being performed. That is, the total ink use amount P2 represents an estimated amount of use of the ink required to print all the read scanned images according to the current setting values. The total sheet cost Q2 represents an estimated cost for the recording sheet which is required to complete the copying function being performed. The controller 11 calculates the total ink use amount P2 and the total sheet cost Q2 by referring to the total-determination-coefficient table illustrated in FIG. 6.

The total-determination-coefficient table illustrated in FIG. 6 is stored in the storage 12, for example. This total-determination-coefficient table stores a total-ink-use-amount determination coefficient $p\_02$ and a total-sheet-cost determination coefficient $q\_02$ for each setting value for each of three setting items, for example.

The reference value of the total-ink-use-amount determination coefficient $p\_02$ is set to 1.0 as an estimate value of the total amount of the ink to be used in the case where copying is performed based on the standard setting values. Also, the total-ink-use-amount determination coefficient $p\_02$ is represented as a ratio between (i) a total ink use amount estimated in the case where printing is performed based on other setting values, and (ii) a total ink use amount estimated in the case where printing is performed based on the standard setting values.

As illustrated in FIG. 6, the total-ink-use-amount determination coefficient $p\_02$ for the number of pages in the document is equal to the number of pages in the document (i.e., the number of the scanned images). That is, in the case where the number of pages of the read document is five, for example, the total-ink-use-amount determination coefficient $p\_02$ is equal to five.

In the present embodiment, the total-ink-use-amount determination coefficient $p\_02$ for each of the layout copy setting and the duplex-copy setting is 1.0 for each of all the setting values as in the case of the standard setting values. This is because the setting values for the layout copy setting and the duplex-copy setting have already been considered appropriately in the unit-ink-use-amount determination coefficient $p\_01$.

In the present embodiment, the total ink use amount P2 is calculated by multiplying the unit ink use amount P1 by each of the total-ink-use-amount determination coefficients $p\_02$ for the three types. For example, each of all the total-ink-use-amount determination coefficients $p\_02$ for the three types is 1.0 in the standard copying as in the first copying example illustrated in FIG. 7A, i.e., in the case where the number of pages of the document is one, and the duplex-copy setting is set at OFF. Thus, the total ink use amount P2 is equal to 1.0 (=the unit ink use amount P1×1.0×1.0=1.0×1.0×1.0×1.0).

In the case where the number of pages in the document is three, and the duplex-copy setting is set at OFF, for example, as in the second copying example illustrated in FIG. 7B, the total ink use amount P2 is equal to 6.0 (=the unit ink use amount P1×3×1.0×1.0=2.0×3×1.0×1.0).

In the case where the number of pages in the document is ten, and the duplex-copy setting is set at "one side to two sides", for example, as in the third copying example illustrated in FIG. 7C, the total ink use amount P2 is equal to 30.0 (=the unit ink use amount P1×10×1.0×1.0=3.0×10×1.0×1.0).

The reference value of the total-sheet-cost determination coefficient q_02 is set to 1.0 as an estimate value of the total number of the recording sheets in the case where copying is performed based on the standard setting values. Also, the total-sheet-cost determination coefficient q_02 is represented as a ratio between (i) an estimate value of the total number of the recording sheets in the case where printing is performed based on other setting values, and (ii) an estimate value of the total number of the recording sheets in the case where printing is performed based on the standard setting values.

As illustrated in FIG. 6, the total-sheet-cost determination coefficient q_02 for the number of pages in the document is equal to the number of pages in the document (i.e., the number of the scanned images). That is, in the case where the number of pages of the read document is five, for example, the total-sheet-cost determination coefficient q_02 is equal to five.

The total-sheet-cost determination coefficient q_02 for the layout copy setting in the present embodiment is set to decrease in increase in the number of scanned images to be printed on one page of the recording sheet.

In the case where printing is to be performed on one side of the recording sheet, the total-sheet-cost determination coefficient q_02 for the duplex-copy setting in the present embodiment is set to 1.0 as the standard value. In the case where printing is to be performed on two sides of the recording sheet, the total-sheet-cost determination coefficient q_02 for the duplex-copy setting is set to a value less than the standard value (e.g., 0.5).

In the present embodiment, the total sheet cost Q2 is calculated by multiplying the unit sheet cost Q1 by each of the total-sheet-cost determination coefficients q_02 for the three types. For example, the number of pages in the document is one, and each of the other two total-sheet-cost determination coefficients q_02 is 1.0 in the standard copying as in the first copying example illustrated in FIG. 7A. Thus, the total sheet cost Q2 is equal to 1.0 (=the unit sheet cost Q1×1×1.0×1.0=1.0×1×1.0×1.0).

In the second copying example illustrated in FIG. 7B, for example, the number of pages in the document is three, and each of the other two total-sheet-cost determination coefficients q_02 is 1.0. Thus, the total sheet cost Q2 is equal to 15.0 (=the unit sheet cost Q1×3×1.0×1.0=5.0×3×1.0×1.0).

In the third copying example illustrated in FIG. 7C, for example, the number of pages in the document is ten, and each of the other two total-sheet-cost determination coefficients q_02 is 0.5. Thus, the total sheet cost Q2 is equal to 15.0 (=the unit sheet cost Q1×10×0.5×0.5=6.0×10×0.5×0.5).

The second preview determination is executed based on the total ink use amount P2 and the total sheet cost Q2 calculated as described above. That is, in the case where one or each of the calculated total ink use amount P2 and total sheet cost Q2 is greater than the threshold value, the controller 11 determines that the second preview condition is satisfied, and in the case where each of the calculated total ink use amount P2 and total sheet cost Q2 is less than or equal to the threshold value, the controller 11 determines that the second preview condition is not satisfied.

It is noted that the threshold value may be different between the total ink use amount P2 and the total sheet cost Q2. The threshold value used for the total ink use amount P2 and the total sheet cost Q2 may be different from the threshold value used for the unit ink use amount P1 and the unit sheet cost Q1. In this case, the threshold values may be settable individually.

After starting the copying function, when the first preview condition is not satisfied, the display device 13 displays the first scanning-state screen 80. After the completion of image reading, when the second preview condition is not satisfied, either, the image processing apparatus 10 uses the printing function to print the scanned images without displaying the preview image. The display device 13 displays a copy-state screen 83 illustrated in FIG. 4 during printing.

When the second preview condition is satisfied after the completion of the image reading, the display device 13 displays a preview screen 90 illustrated in FIG. 4. The preview screen 90 contains a preview image 93. The preview image 93 indicates an actual printing state, that is, the preview image 93 indicates a state in which the scanned image is to be actually printed on the recording sheet of the set sheet size. The preview image 93 may contain an image indicating the outline of the recording sheet.

The preview screen 90 further contains a Start button 92 and a Cancel button 91. When the Start button 92 is selected, the image processing apparatus 10 uses the printing function to print the scanned images. The display device 13 displays the copy-state screen 83 illustrated in FIG. 4 during printing.

When the Cancel button 91 is selected on the preview screen 90, the display device 13 displays the copy-start screen 50 (see FIG. 3) without printing. After starting the copying function, when the controller 11 determines in the first preview determination that the first preview condition is satisfied, the display device 13 displays a second scanning-state screen 85 illustrated in FIG. 4 during reading of the document.

The second scanning-state screen 85 contains a message "Preview Image being Created" indicating that the preview image is being created, in other words, the preview screen 90 is to be displayed in advance of the start of printing after the completion of scanning. The second scanning-state screen 85 further contains a Preview Cancel button 86.

When the Preview Cancel button 86 is selected, the display device 13 displays the first scanning-state screen 80 instead of the second scanning-state screen 85. Operations and screen transitions after displaying the first scanning-state screen 80 are the same as those described above. Thus, in the case where the second preview condition is satisfied after the completion of image reading even when the Preview Cancel button 86 is selected, the display device 13 displays the preview screen 90. It is noted that, in the case where the Preview Cancel button 86 is selected on the second scanning-state screen 85, even when the second preview condition is thereafter satisfied, printing may be started without displaying the preview screen 90.

1-4. Copy Process

Figure 8:
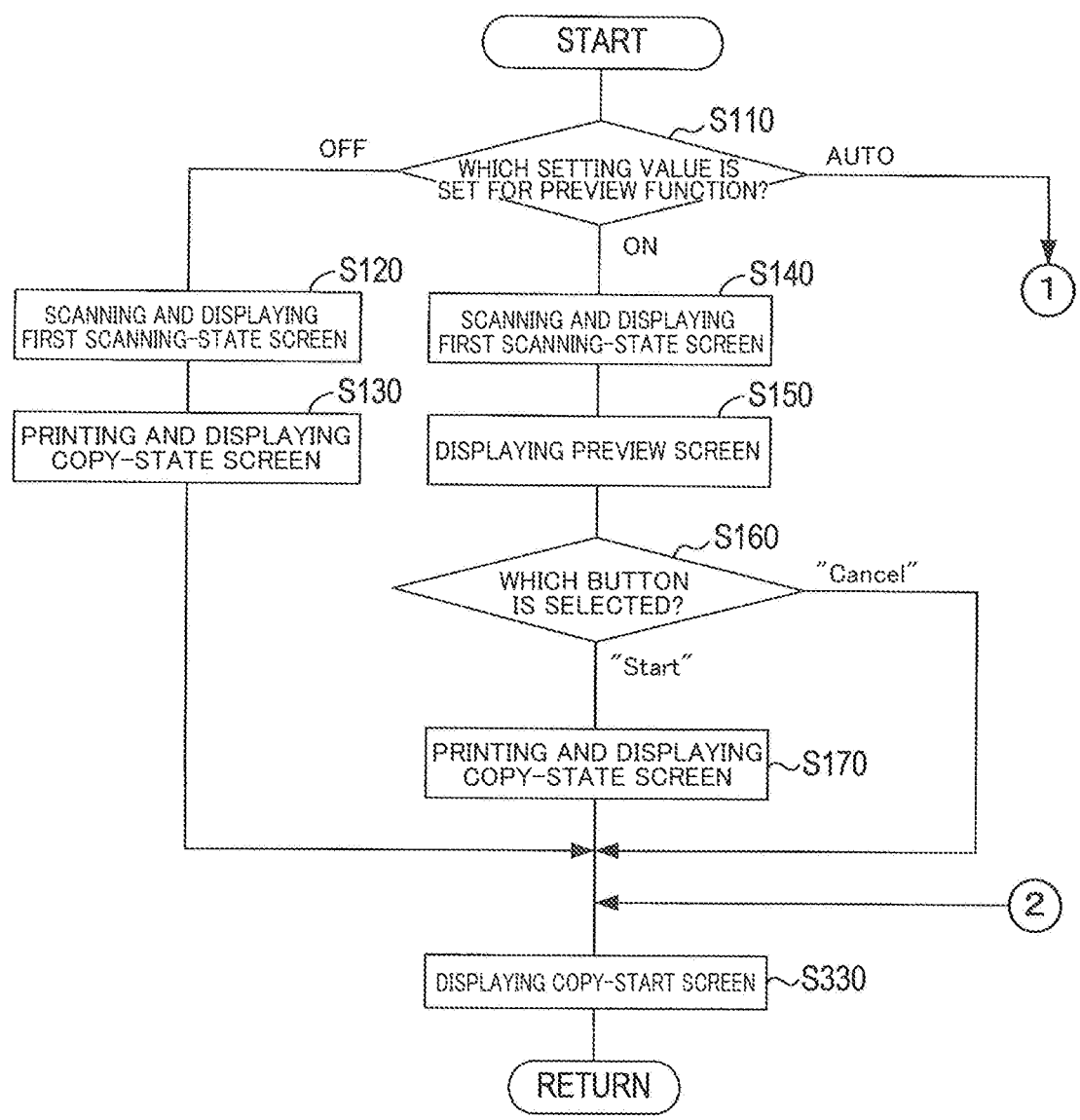
FIG. 8 is a flowchart representing a portion of a copy process in a first embodiment.
Figure 9:
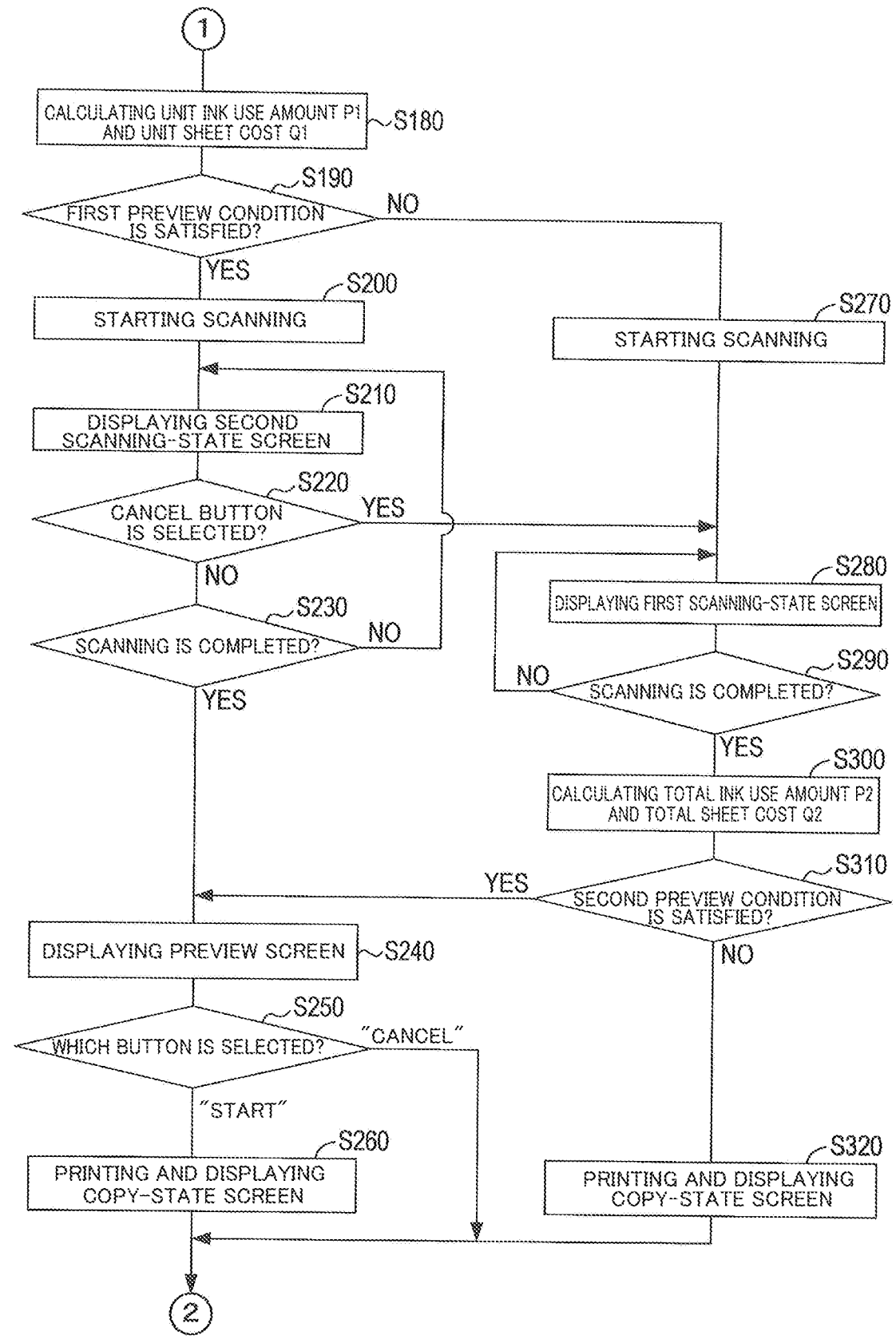
FIG. 9 is a flowchart representing the other portion of the copy process in the first embodiment (continued from FIG. 8)

There will be next described the copy process executable by the controller 11 with reference to FIGS. 8 and 9. The copying function is performed by the controller 11 executing the copy process. When the B/W Start button 57 or the Color Start button 58 is tapped on the copy-start screen 50 illustrated in FIG. 3, the controller 11 executes the copy process according to the programs for the copy process in FIGS. 8 and 9 which are stored in the storage 12. That is, after detection of tapping of the B/W Start button 57 or the Color Start button 58 as a start instruction for starting the copying function, the controller 11 executes determination at S180 and determination at S310 which will be described below in FIG. 9.

When the copy process is started, the controller 11 at S110 determines the setting value for the preview function. That is, the controller 11 determines which setting value is set for the preview function among "OFF", "ON", and "AUTO".

When the preview function is set at "OFF", the controller 11 at S120 controls the image processing apparatus 10 to perform scanning, i.e., reading of the document. The controller 11 displays the first scanning-state screen 80 on the display device 13 during scanning. When the scanning is completed, the controller 11 creates scanned data based on the scanned image, this flow goes to S130. It is noted that the scanned data may be created as needed during scanning. The controller 11 at S130 controls the image processing apparatus 10 to perform printing based on the scanned data. That is, the image processing apparatus 10 prints the scanned image on the recording sheet based on the scanned data according to the setting values for the respective setting items in the copying function. The controller 11 displays the copy-state screen 83 on the display device 13 during printing. After the completion of the printing, this flow goes to S330 at which the controller 11 displays the copy-start screen 50 on the display device 13.

When the controller 11 at S110 determines that the preview function is set at "ON", the controller 11 at S140 controls the image processing apparatus 10 to perform scanning. The controller 11 displays the first scanning-state screen 80 on the display device 13 during scanning. When the scanning is completed, the controller 11 creates scanned data based on the scanned image, and this flow goes to S150. It is noted that the scanned data may be created as needed during scanning. The controller 11 at S150 displays the preview screen 90 on the display device 13.

The controller 11 at S160 determines which button is selected on the preview screen 90. When the Cancel button 91 is selected, this flow goes to S330. When the Start button 92 is selected, the controller 11 at S170 controls the image processing apparatus 10 to perform printing based on the scanned data as in the processing at S130. The controller 11 displays the copy-state screen 83 on the display device 13 during printing. After the completion of the printing, this flow goes to S330 at which the controller 11 displays the copy-start screen 50 on the display device 13.

When the controller 11 at S110 determines that the preview function is set at "AUTO", this flow goes to S180 (FIG. 9). The controller 11 at S180 calculates the unit ink use amount P1 and the unit sheet cost Q1. The controller 11 executes the first preview determination at S190. That is, the controller 11 determines whether the first preview condition is satisfied, based on the unit ink use amount P1 and the unit sheet cost Q1 calculated at S180.

When the first preview condition is satisfied, that is, when the preview image 93 highly needs to be displayed, the controller 11 at S200 controls the image processing apparatus 10 to start scanning the document and at S210 displays the second scanning-state screen 85 on the display device 13.

The controller 11 at S220 determines whether the Preview Cancel button 86 is selected on the second scanning-state screen 85. When the Preview Cancel button 86 is selected, this flow goes to S280. When the Preview Cancel button 86 is not selected, this flow goes to S230.

The controller 11 at S230 determines whether scanning of all the documents set on the document table or the ADF, i.e., all the documents to be read, is completed. When the scanning is not completed, this flow goes to S210. When the scanning is completed, the controller 11 creates scanned data based on the scanned image and at S240 displays the preview screen 90 on the display device 13. It is noted that the scanned data may be created as needed during scanning. The preview screen 90 contains the preview image 93, i.e., the scanned image represented by the created scanned data.

The controller 11 at S250 determines which button is selected on the preview screen 90, as in the processing at S160. When the Cancel button 91 is selected, this flow goes to S330. When the Start button 92 is selected, the controller 11 at S260 controls the image processing apparatus 10 to perform printing based on the scanned data as in the processing at S170. The controller 11 displays the copy-state screen 83 on the display device 13 during printing. After the completion of the printing, this flow goes to S330 at which the controller 11 displays the copy-start screen 50 on the display device 13.

When the controller 11 at S190 determines that the first preview condition is not satisfied, this flow goes to S270 at which the controller 11 controls the image processing apparatus 10 to start scanning the document. The controller 11 at S280 displays the first scanning-state screen 80 on the display device 13. The controller 11 at S290 determines whether scanning of the documents is completed, as in the processing at S230. When the scanning is not completed, this flow goes to S280. When the scanning is completed, the controller 11 creates scanned data based on the scanned image, this flow goes to S300. It is noted that the scanned data may be created as needed during scanning.

The controller 11 at S300 calculates the total ink use amount P2 and the total sheet cost Q2. The controller 11 executes the second preview determination at S310. That is, the controller 11 determines whether the second preview condition is satisfied, based on the total ink use amount P2 and the total sheet cost Q2 calculated at S300.

In the case where the second preview condition is satisfied, that is, when the preview image 93 highly needs to be displayed, this flow goes to S240 at which the controller 11 displays the preview screen 90 on the display device 13. In the case where the second preview condition is not satisfied, as in the processing at S260, the controller 11 at S320 controls the image processing apparatus 10 to perform printing based on the scanned data. The controller 11 displays the copy-state screen 83 on the display device 13 during printing. After the completion of the printing, this flow goes to S330.

1-5. Effects

In the present embodiment described above, the preview function can be set to any one of "ON", "OFF", and "AUTO". This enables the user to set the preview function in accordance with a situation in which the user wants to display the preview screen 90, to display the preview screen 90 at an appropriate frequency desired by the user.

In the case where the preview function is set at "AUTO", when the copying function is started, the controller 11 executes the first preview determination based on the current setting values. When the controller 11 determines in the first preview determination that the first preview condition is satisfied, the display device 13 displays the preview screen 90 before printing. This configuration enables the controller 11 to appropriately determine the requirement of display of the preview screen 90 in accordance with the current setting values, making it possible to provide the image processing apparatus 10 convenient for the user.

When the controller 11 determines in the first preview determination that the first preview condition is not satisfied, the controller 11 executes the second preview determination before printing and after the completion of scanning. When the controller 11 determines in the second preview determination that the second preview condition is satisfied, the display device 13 displays the preview screen 90 before printing. This configuration enables the controller 11 to more appropriately determine the requirement of display of the preview screen 90 in accordance with the result of actual scanning, making it possible to provide the image processing apparatus 10 more convenient for the user.

Each of the first preview determination and the second preview determination is executed based on the estimate values of the amount of use of the ink and the cost for the recording sheet to be used for copying. That is, the easiness of display of the preview screen 90 increases with increase in the estimated amount of use of the ink and increases with increase in the estimated number of the recording sheets. That is, the easiness of display of the preview screen 90 increases with increase in cost for copying. Display of the preview screen 90 enables the user to check whether printing is to be performed properly before printing, and when it is expected that printing cannot be performed properly, the user can cancel the printing. This efficiently reduces consumption of the ink and the recording sheets due to failure of copying.

In the present embodiment, the user can operate the determination-sensitivity-setting screen 45 illustrated in FIG. 2 to change the preview determination sensitivity, i.e., the above-described threshold values. This configuration enables the user to set appropriate preview determination sensitivity related to the preference or the requirement of the user, for example, making it possible to provide the image processing apparatus 10 more convenient for the user.

In the present embodiment, the document is one example of a reading medium. The recording sheet is one example of a recording medium. Each of the setting items settable on the setting-item screen in FIG. 3 is one example of a print setting item. The scanned image is one example of a read image. The number of all the pages in document read by scanning (THE NUMBER OF PAGES IN DOCUMENT m in FIG. 6), i.e., the total number of the scanned images, is one example of reading-obtained information. The number of copies is one example of the number of prints. The sheet type is one example of a medium type. The sheet size is one example of a medium size. The copy image quality is one example of a print image quality. The layout copy setting is one example of a print layout setting. The threshold value is one example of each of a first color-material threshold value, a first cost threshold value, a second color-material threshold value, and a second cost threshold value. The unit ink use amount P1 is one example of a unit color-material use amount. The unit sheet cost Q1 is one example of a unit medium cost. The total ink use amount P2 is one example of a total color-material use amount. The total sheet cost Q2 is one example of a total medium cost.

The processings at S200-S230 and S270-S290 are one example of a reading processing. The processings at S190 and S310 are one example of a preview determination processing. The processing at S240 is one example of a preview-image display processing. The processing at S260 is one example of a first image processing. The processing at S320 is one example of a second image processing. The processings at S180-S190 are one example of an initial determination processing. Printing at each of S260 and S320 is one example of a particular processing. The processing executed via the determination-sensitivity-setting screen 45 in FIG. 2 to set the preview determination sensitivity in response to selection of the user is one example of a threshold-value changing processing.

2. Second Embodiment

While the preview determination is executed based on the unit ink use amount P1, the unit sheet cost Q1, the total ink use amount P2, and the total sheet cost Q2 in the first embodiment, the preview determination may be executed in another method.

For example, the preview determination may be executed based on the unit-ink-use-amount determination coefficient p_01, the unit-sheet-cost determination coefficient q_01, the total-ink-use-amount determination coefficient p_02, and the total-sheet-cost determination coefficient q_02 for each of the setting items. One example of this preview determination will be described as a second embodiment.

Figure 10:
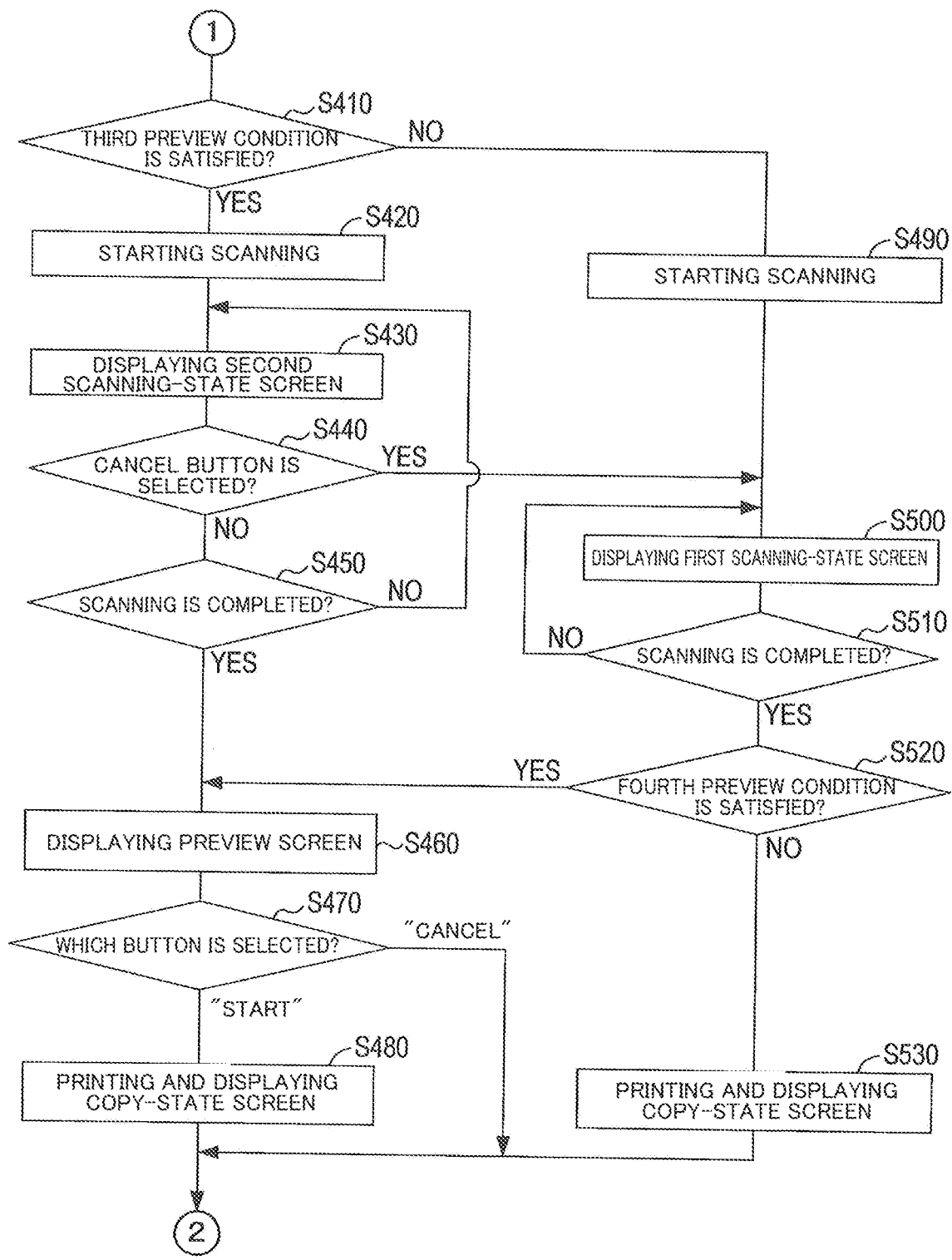
FIG. 10 is a flowchart representing the other portion of the copy process in a second embodiment (continued from FIG. 8).

More specifically, another example of the copy process in the first embodiment in FIGS. 8 and 9 will be described with reference to FIG. 10. In the second embodiment, when the controller 11 at S110 determines that the preview function is set at "AUTO", this flow goes to S410 in FIG. 10.

The controller 11 at S410 determines whether a third preview condition is satisfied. The third preview condition is satisfied in the case where at least particular one of the following conditions (1a)-(1e) is satisfied. The condition (1a) is a condition that the current setting value for the number of copies is greater than or equal to a number threshold value. The number threshold value may be any value and may be three, for example. The condition (1b) is a condition that the current setting value for the copy image quality is any one of particular copy image qualities of at least one kind. The particular copy image quality may be any image quality and may be "Photo", for example. The condition (1c) is a condition that the current setting value for the sheet size is greater than or equal to a size threshold value. The size threshold value may be any value and may be greater than or equal to A3, for example. The condition (1d) is a condition that the current setting value for the sheet type is any one of particular sheet types of at least one kind. The particular sheet type may be any sheet type and may be any of all the sheet types other than the plain paper, for example. The condition (1e) is a condition that the current setting value for the layout copy setting is set to divide one scanned image into a plurality of images and print the images respectively on a plurality of recording sheets.

When the controller 11 at S410 determines that the third preview condition is satisfied, this flow goes to S420. The processings at S420-S480 are the same as the processings at S200-S260 in FIG. 9, and an explanation of which is dispensed with. When the controller 11 at S410 determines that the third preview condition is not satisfied, this flow goes to S490. The processings at S490-S510 are the same as the processings at S270-S290 in FIG. 9, and an explanation of which is dispensed with. When the scanning is completed at S510, the controller 11 creates scanned data based on the scanned image, and this flow goes to S520.

The controller 11 at S520 determines whether a fourth preview condition is satisfied. The fourth preview condition may, for example, be a condition that the number of all the pages in the scanned document, i.e., the total number of the scanned images, is greater than or equal to an image-number threshold value. The image-number threshold value may be any value and may be ten, for example.

As another example, the fourth preview condition may be a condition that the size of the scanned image actually read is greater than the sheet size set at present. The controller 11 is capable of detecting the size of the read scanned image. This configuration enables the controller 11 to determine the relationship between the size of the actually-scanned image and the sheet size set at present.

When the controller 11 at S520 determines that the fourth preview condition is satisfied, this flow goes to S460 at which the controller 11 displays the preview screen 90 on the display device 13. When the controller 11 determines that the fourth preview condition is not satisfied, as in the processing at S320 in FIG. 9, the controller 11 at S530 controls the image processing apparatus 10 to perform printing based on the scanned data. The controller 11 displays the copy-state screen 83 on the display device 13 during printing. After the completion of the printing, this flow goes to S330.

3. Modifications

While the embodiments have been described above, it is to be understood that the disclosure is not limited to the details of the illustrated embodiments, but may be embodied with various changes and modifications, which may occur to those skilled in the art, without departing from the spirit and scope of the disclosure.

The preview function in the first embodiment is configured such that the controller 11 executes the first preview determination and may execute the second preview determination depending upon the result of the first preview determination. In a first modification, however, the controller 11 may not execute the second preview determination and may not execute the first preview determination in contrast.

In a second modification, the setting values for the preview determination sensitivity are not limited to the sensitivities 1-4. Each of the threshold values corresponding to the respective preview determination sensitivities may be different from the value used in the above-described embodiment.

In a third modification, the preview determination, i.e., determination of whether the preview is required, may be executed based on anything and in any method. For example, the controller 11 may execute the preview determination by referring to the setting values used for performing the scanning function. In another example, the controller 11 may determine that the preview is required, in the case where there is a certain degree of the possibility of a failure of copying. One example of the case where there is a certain degree of the possibility of a failure of copying is a case where the tray is mounted or removed within a specific period from the present time. This is because mounting or removing of the tray indicates a possibility of replacement of the recording sheet in the tray with a recording sheet of another size, and in this case there is a possibility that the setting value for the sheet size does not match the actual size of the recording sheet in the tray, and copying is not performed appropriately.

In a fourth modification, the preview function may be performed in a function including the scanning function and different from the copying function. That is, the present disclosure may be applied to various function executing apparatuses having not only the copying function but also the scanning function for reading the image.

For example, the preview image may be displayed in the scan-to-USB-memory function before outputting the scanned data to the USB memory. In this case, the image processing apparatus 10 may be configured to execute the preview determination using the technique according to the present disclosure and display the preview image in accordance with the result of the determination.

In another example, the preview image may be displayed in the scan-to-email-transmission function before transmission of the scanned data by electronic mail. Also in this case, the image processing apparatus 10 may be configured to execute the preview determination using the technique according to the present disclosure and display the preview image in accordance with the result of the determination.

In a fifth modification, an apparatus configured to display the preview image is not limited to the image processing apparatus 10 and may be another apparatus different from the image processing apparatus 10. For example, the scanned data may be transmitted from the image processing apparatus 10 to an information processing apparatus data-communicably connected to the image processing apparatus 10, and a preview image of a scanned image represented by the scanned data may be displayed on a display device (e.g., a liquid crystal display) of the information processing apparatus.

In other modifications, the plurality of functions of one element in the above-described embodiment may be achieved by a plurality of elements, and one function of one element may be achieved by a plurality of elements. A plurality of functions of a plurality of elements may be achieved by one element, and one function achieved by a plurality of elements may be achieved by one element. The configurations in the above-described embodiment may be omitted partly. At least a portion of the configurations in the above-described embodiment may be added to or replaced with another portion of the configurations in the above-described embodiment.

What is claimed is:

1. An image processing apparatus, comprising:
   a reading device;
   a display device;
   a printer configured to print an image on a recording medium;
   an input device; and
   a processor configured to execute:
      a first preview determination processing in which the processor determines whether a preview image corresponding to an image which is scanned by the reading device is to be displayed on the display device, based on a setting value for at least one print setting item for the printer;
      a scanned-image-data-generating processing in which the processor controls the reading device to scan the image formed on a reading medium so as to generate scanned-image data, the scanned-image-data-generating processing being executed after the determination in the first preview determination processing is completed;

a first image processing in which in a case where the processor determines in the first preview determination processing that the preview image is to be displayed, the processor controls the display device to display the preview image based on the scanned-image data generated in the scanned-image-data-generating processing, and executes a particular processing based on the scanned-image data generated in the scanned-image-data-generating processing in a case where a processing instruction is input via the input device after the preview image is displayed;

a second image processing in which in a case where the processor determines in the first preview determination processing that the preview image is not to be displayed, the processor executes the particular processing based on the scanned-image-data without displaying the preview image; and a second preview determination processing in which the processor determines whether the preview image is to be displayed on the display device, based on reading-obtained information obtained in the scanned-image-data-generating processing, the second preview determination processing being executed after the scan in the scanned-image-data-generating processing is completed, wherein in a case where the processor determines in the second preview determination processing that the preview image is to be displayed, the processor controls the display device to display the preview image based on the scanned-image-data generated in the scanned-image-data-generating processing, and executes the particular processing based on the scanned-image data generated in the scanned-image-data-generating processing in the case where the processing instructions is input via the input device after the preview image is displayed; and wherein in a case where the processor determines in the second preview determination processing that the preview image is not to be displayed, the processor executes the particular processing based on the scanned-image-data without displaying the preview image, wherein the particular processing comprises a print processing in which the processor controls the printer to print the scanned image based on the scanned image data based on the setting value for at least one print setting item, wherein the at least one print setting item comprises at least one of a print image quality of the read image, a medium size indicating a size of the recording medium on which the read image is to be printed, and a print layout setting indicating a size of the read image to be printed within the recording medium or indicating whether one read image is divided into a plurality of images, and the plurality of images are to be printed on a plurality of recording media, respectively, and wherein the processor is configured to determine in the first preview determination processing whether the preview image is to be displayed at least based on the setting value for the at least one print setting item.

2. The image processing apparatus according to claim 1, wherein the processor is configured to determine in the first preview determination processing whether the preview image is to be displayed, in a case where a particular at least one of the following conditions is satisfied:

a condition that the print image quality is any one of particular print image qualities of at least one kind in a case where the at least one print setting item comprises the print image quality; and a condition that the medium size is greater than or equal to a size threshold value in a case where the at least one print setting item comprises the medium size;

a condition that the print layout setting is set to divide one read image into a plurality of images and print the plurality of images respectively on a plurality of recording media, in a case where the at least one print setting item comprises the print layout setting.

3. The image processing apparatus according to claim 1, wherein it is determined that the preview image is to be displayed in the first preview determination processing, in a case where one or both of the following conditions are satisfied:

a condition that the processor, based on the setting value for the at least one print setting item, determines a unit color-material use amount that is an amount of use of a color material required for printing one read image on the recording medium in one copy, and the determined unit color-material use amount is greater than a first color-material threshold value.

4. The image processing apparatus according to claim 3, wherein the reading-obtained information comprises a read-image number that is the number of read images, and wherein the processor is configured to determine in the second preview determination processing that the preview image is to be displayed, in a case where the processor determines in the first preview determination processing that the preview image is not to be displayed and in a case where one or both of the following conditions are satisfied:

a condition that the processor determines a total color-material use amount that is an amount of use of a color material required for printing at least one read image corresponding to the read-image number based on the setting value for the at least one print setting item, and the determined total color-material use amount is greater than a second color-material threshold value; and a condition that the processor determines a total medium cost that is a cost for at least one recording medium required for printing the at least one read image corresponding to the read-image number based on the setting value for the at least one print setting item, and the determined total medium cost is greater than a second cost threshold value.

5. The image processing apparatus according to claim 3, wherein the processor is configured to execute a threshold-value changing processing in which the processor changes the first color-material threshold value in response to a threshold-value changing request input via the input device.

6. The image processing apparatus according to claim 1, wherein the processor is configured to at least determine whether the preview image is to be displayed, based on the reading-obtained information obtained in the scanned-image-data-generating processing in the second preview determination processing, and wherein the reading-obtained information comprises a read-image number that is the number of read images based on the scanned-image data.

7. The image processing apparatus according to claim 6, wherein the processor is configured to determine in the second preview determination processing that the preview image is to be displayed, in a case where the read-image number is greater than or equal to an image-number threshold value.

8. The image processing apparatus according to claim 6,
wherein the reading-obtained information comprises a size of the read image, and
wherein the processor is configured to determine in the second preview determination processing that the preview image is to be displayed, in a case where the size of the read image is greater than a size of the recording medium.

9. The image processing apparatus according to claim 6,
wherein the processor is configured to determine in the second preview determination processing that the preview image is to be displayed, in a case where one or both of the following conditions are satisfied:
- a condition that the processor determines a total color-material use amount that is an amount of use of a color material required for printing at least one read image corresponding to the read-image number based on the setting value for the at least one print setting item, and the determined total color-material use amount is greater than a second color-material threshold value; and
- a condition that the processor determines a total medium cost that is a cost for at least one recording medium required for printing the at least one read image corresponding to the read-image number based on the setting value for the at least one print setting item, and the determined total medium cost is greater than a second cost threshold value.

10. The image processing apparatus according to claim 9,
wherein the processor is configured to execute a threshold-value changing processing in which the processor changes the second color-material threshold value, the second cost threshold value, or the second color-material threshold value and the second cost threshold value in response to a threshold-value changing request input via the input device.

11. The image processing apparatus according to claim 1,
wherein the processor is configured to:
- determine in the first preview determination processing whether the preview image is to be displayed on the display device, after a start instruction is input via the input device; and
- execute the particular processing in the first image processing in a case where the processing instruction is input in a state in which the preview image is displayed.

12. The image processing apparatus according to claim 11, wherein the processor is configured to control the display device to display a start image to which the start instruction is input, and the start instruction is an instruction for starting one of reading of the reading device and printing of the printer based on the at least one print setting item having been set.

* * * * *